US012271685B2

(12) United States Patent
Bausek et al.

(10) Patent No.: US 12,271,685 B2
(45) Date of Patent: *Apr. 8, 2025

(54) SYSTEM FOR ANNOTATIONS IN A CONTENT MODEL OF A CONTENT MANAGEMENT SYSTEM

(71) Applicant: Contentful GmbH, Berlin (DE)

(72) Inventors: Richard Bausek, Berlin (DE); Luca Bianconi, Berlin (DE); Andreas Hoernicke, Berlin (DE); Paolo Negri, Berlin (DE)

(73) Assignee: Contentful GmbH, Berlin (DE)

( * ) Notice: Subject to any disclaimer, the term of this patent is extended or adjusted under 35 U.S.C. 154(b) by 17 days.

This patent is subject to a terminal disclaimer.

(21) Appl. No.: 17/717,835

(22) Filed: Apr. 11, 2022

(65) Prior Publication Data
US 2023/0325585 A1    Oct. 12, 2023

(51) Int. Cl.
*G06F 40/169* (2020.01)
*G06F 9/54* (2006.01)
*G06F 40/137* (2020.01)

(52) U.S. Cl.
CPC ............ *G06F 40/169* (2020.01); *G06F 9/547* (2013.01); *G06F 40/137* (2020.01)

(58) Field of Classification Search
CPC ....... G06F 40/137; G06F 40/169; G06F 9/547
USPC ...................................................... 715/230
See application file for complete search history.

(56) References Cited

U.S. PATENT DOCUMENTS

| 11,120,200 | B1* | 9/2021 | Totale ................ G06F 3/04842 |
| 11,175,972 | B1 | 11/2021 | Elizbieciak et al. |
| 11,210,364 | B1* | 12/2021 | Felt ........................ G06F 16/176 |
| 11,435,984 | B1 | 9/2022 | Elizbieciak et al. |
| 2015/0082148 | A1* | 3/2015 | Lai ........................ G06F 40/151 |
| | | | 715/235 |
| 2020/0012623 | A1* | 1/2020 | Cole ..................... G06F 16/252 |
| 2020/0120170 | A1* | 4/2020 | Amitay ............... G06F 3/04817 |

(Continued)

OTHER PUBLICATIONS

M. I. Podean, D. Benta and R. A. Costin, "On Supporting Creative Interaction in Collaborative Systems: A Content Oriented Approach," 2011 IEEE Luxembourg, 2011, pp. 400-406, (Year: 2022).*

(Continued)

*Primary Examiner* — Kieu D Vu
*Assistant Examiner* — Nicholas Hasty
(74) *Attorney, Agent, or Firm* — PENILLA IP, APC

(57) ABSTRACT

A system comprising at least one server computer, said at least one server computer configured to perform a method for activating editing functionality in a content management system (CMS), said method including the following operations: the CMS providing a content management application programming interface (CMA) enabling management of a content project, the content project having a content model defined by a plurality of content types, each content type defining one or more fields, said content types defining structures for content managed via the CMS; responsive to an application programming interface (API) call to the CMA, then assigning one or more annotations to one or more of the content types; wherein for the content types having annotations assigned thereto, the assigned annotations enable an editing functionality of an editing application interfaced with the CMS.

15 Claims, 12 Drawing Sheets

(56) References Cited

U.S. PATENT DOCUMENTS

2020/0327149 A1\* 10/2020 Brennenstuhl ...... G06F 16/2365
2020/0403818 A1\* 12/2020 Daredia ................. G10L 17/00
2022/0391177 A1 12/2022 Elizbieciak et al.

OTHER PUBLICATIONS

PCT/EP2023/059462 International Search Report and Written Opinion, ISA 220, Jun. 28, 2023.

\* cited by examiner

SYSTEM FOR ANNOTATIONS IN A CONTENT MODEL OF A CONTENT MANAGEMENT SYSTEM

FIELD OF THE DISCLOSURE

The present disclosure relates to annotations in a content model of a content management system.

BACKGROUND

Description of the Related Art

A content management system (CMS) provides many benefits by allowing users to flexibly structure and manage content, independent of the presentation of such content through various contexts such as websites and mobile apps. Content can be composed in a modular format, enabling an individual piece of content to be created once, and then reused across different presentation contexts. Further, the appearance of content can be adjusted to suit the presentation context at the time it is retrieved and presented to the consuming end user.

A content model can define the structures for management of content in the CMS. However, when such structures are defined and then used, it can be difficult to later adapt the existing content model for a given application.

It is in this context that implementations of the disclosure arise.

SUMMARY

Implementations of the present disclosure include methods and systems relating to annotations in a content model of a content management system.

Generally speaking, annotations provide flexible means to attach semantic metadata to objects in a modeled context of a CMS, allowing the specification of non-content data that client applications can interpret and adjust their behavior accordingly. In some implementations, an aggregate root annotation is assigned to a content type to mark it as an aggregate. In some implementations, an editor application organizes content editing around the concept of pages which can be identified by a root annotation, such that a content type having the aggregate root annotation assigned is treated as a page type. The aggregate root annotation in such implementations can also implicitly define the boundary of a page, such that any action on a page is only permitted within the same aggregate root. Furthermore, in some implementations, an aggregate component annotation is assigned to a reference field to mark its linked entries to be part of the parent aggregate root. In the editor application, this may be used to automatically load and expand any sub-entries on reference fields that have the aggregate component annotation assigned. Also, the aggregate component annotation assignment may support deep cloning functionality, wherein the nested component entries are also duplicated instead of being only re-linked to the page.

In some implementations, a system comprising at least one server computer is provided, said at least one server computer configured to perform a method for activating editing functionality in a content management system (CMS), said method including the following operations: the CMS providing a content management application programming interface (CMA) enabling management of a content project, the content project having a content model defined by a plurality of content types, each content type defining one or more fields, said content types defining structures for content managed via the CMS; responsive to an application programming interface (API) call to the CMA, then assigning one or more annotations to one or more of the content types; wherein for the content types having annotations assigned thereto, the assigned annotations enable an editing functionality of an editing application interfaced with the CMS.

In some implementations, assigning one or more annotations includes creating a metadata object in a given content type and adding an annotation to the metadata object.

In some implementations, the annotation identifies the given content type as a target of the annotation.

In some implementations, the annotation identifies a field of the given content type as a target of the annotation.

In some implementations, the annotations include an annotation enabling recognition of a given content type for editing by the editing application.

In some implementations, the annotation enabling recognition of the given content type identifies the given content type as a root of an aggregate for the editing application.

In some implementations, the annotations include an annotation enabling automatic display behavior of a field of a given content type by the editing application.

In some implementations, the automatic display behavior includes automatic expansion of components of the field of the given content type in a tree view provided by the editing application that provides a hierarchical view of the content types.

In some implementations, the automatic display behavior includes automatic expansion of components of the field of the given content type for editing in an editing view provided by the editing application that enables editing of contents of the field.

In some implementations, the API call to the CMA is in response to input received through a web editor of the CMS, the web editor being separate from the editing application.

In some implementations, the content project includes one or more content entries defined from said content types, the content entries being structured according to the content types, the content entries configured to store the content that is managed via the CMS, and wherein the editing functionality of the editing application is for editing of the content entries based on the annotations assigned to the content types corresponding to the content entries.

In some implementations, the annotations enable the editing functionality of the editing application without altering the structures defined by the content types for the content managed via the CMS.

In some implementations, a system comprising at least one server computer is provided, said at least one server computer configured to perform a method for activating editing functionality in a content management system (CMS), said method including the following operations: the CMS providing a content management application programming interface (CMA) enabling management of a content project, the content project having a content model defined by a plurality of content types, each content type defining one or more fields, said content types defining structures for content managed via the CMS; responsive to one or more application programming interface (API) calls to the CMA, then assigning one or more annotations to one or more of the content types; wherein for the content types having annotations assigned thereto, the assigned annotations enable an editing functionality of an editing application which accesses the CMA to edit the content managed via the CMS; wherein the annotations include a root annotation that identifies a given content type as a root of an aggregate for the editing application, and wherein the annotations include a component annotation that identifies a given field of the given content type as a component member of the aggregate.

In some implementations, assigning one or more annotations includes creating a metadata object in a given content type and adding an annotation to the metadata object.

In some implementations, the component annotation enables an automatic display behavior of the given field of the given content type by the editing application.

In some implementations, the automatic display behavior includes automatic expansion of components of the given field of the given content type in a tree view provided by the editing application that provides a hierarchical view of the content types.

In some implementations, the automatic display behavior includes automatic expansion of components of the given field of the given content type for editing in an editing view provided by the editing application that enables editing of contents of the given field.

In some implementations, the one or more API calls to the CMA are in response to input received through a web editor of the CMS, the web editor being separate from the editing application.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods and systems relating to annotations in a content model of a content management system.

It will be obvious, however, to one skilled in the art, that the present disclosure may be practiced without some or all of the specific details presently described. In other instances, well known process operations have not been described in detail in order not to unnecessarily obscure the present disclosure.

Figure 1:
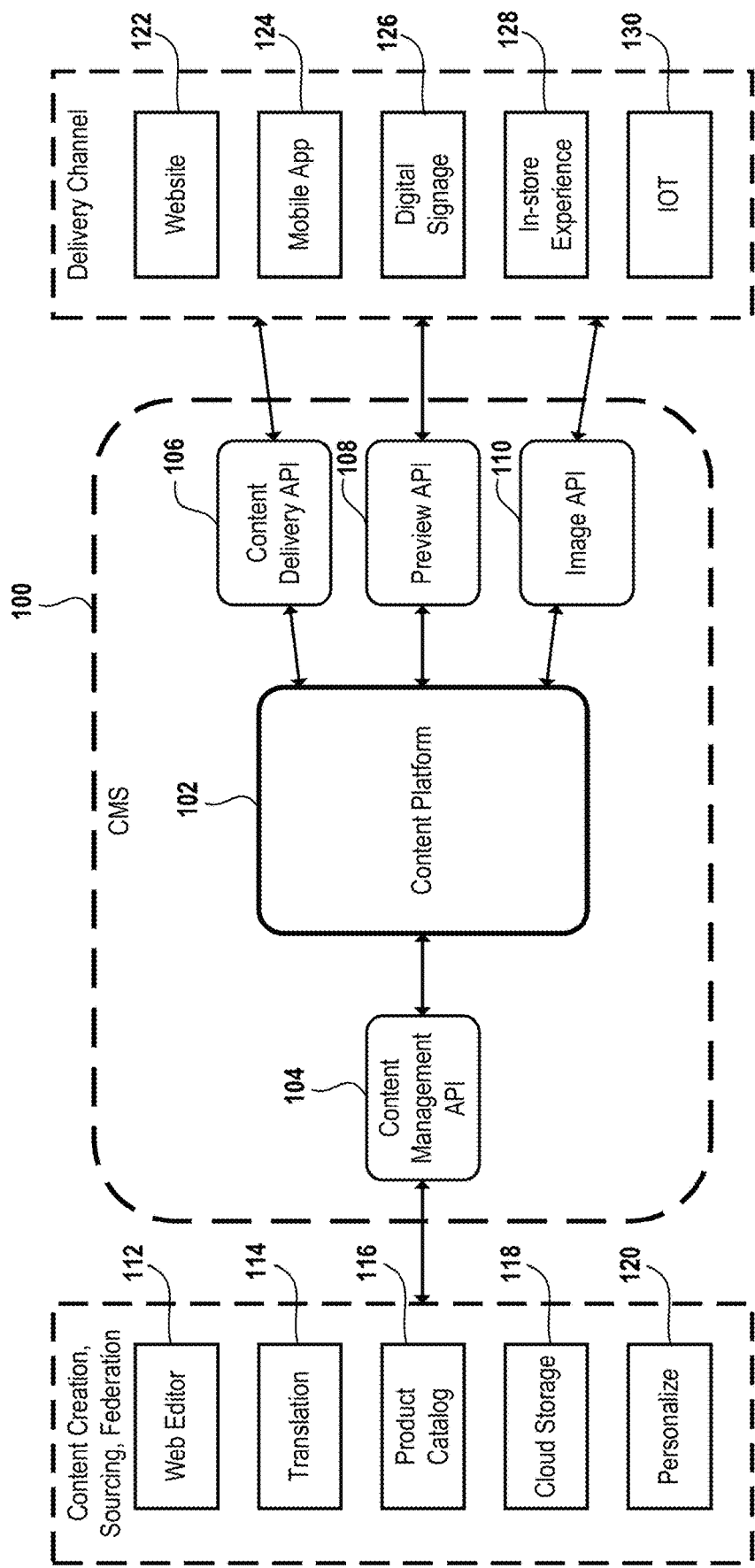
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g. JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g. an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to effect content personalization via the content management API 104. Personalization information can be utilized to enable customization of content or downstream customization of content delivery. Examples of personalization information can include user demographic information (e.g. age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g. website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth-constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g. preview deployment of a website or a preview build of a mobile app, that allows content managers and authors to view their work in-context, as if it were published, using a preview access token as though it were delivered by the content delivery API 106.

In some implementations, an images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g. HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geolocation. In some implementations, user interface (UI) extensions are supported, to enable building of customized editing experiences for the web editor. In some implementations, app installations are supported, extending and expanding the capabilities of the CMS web application.

Figure 2:
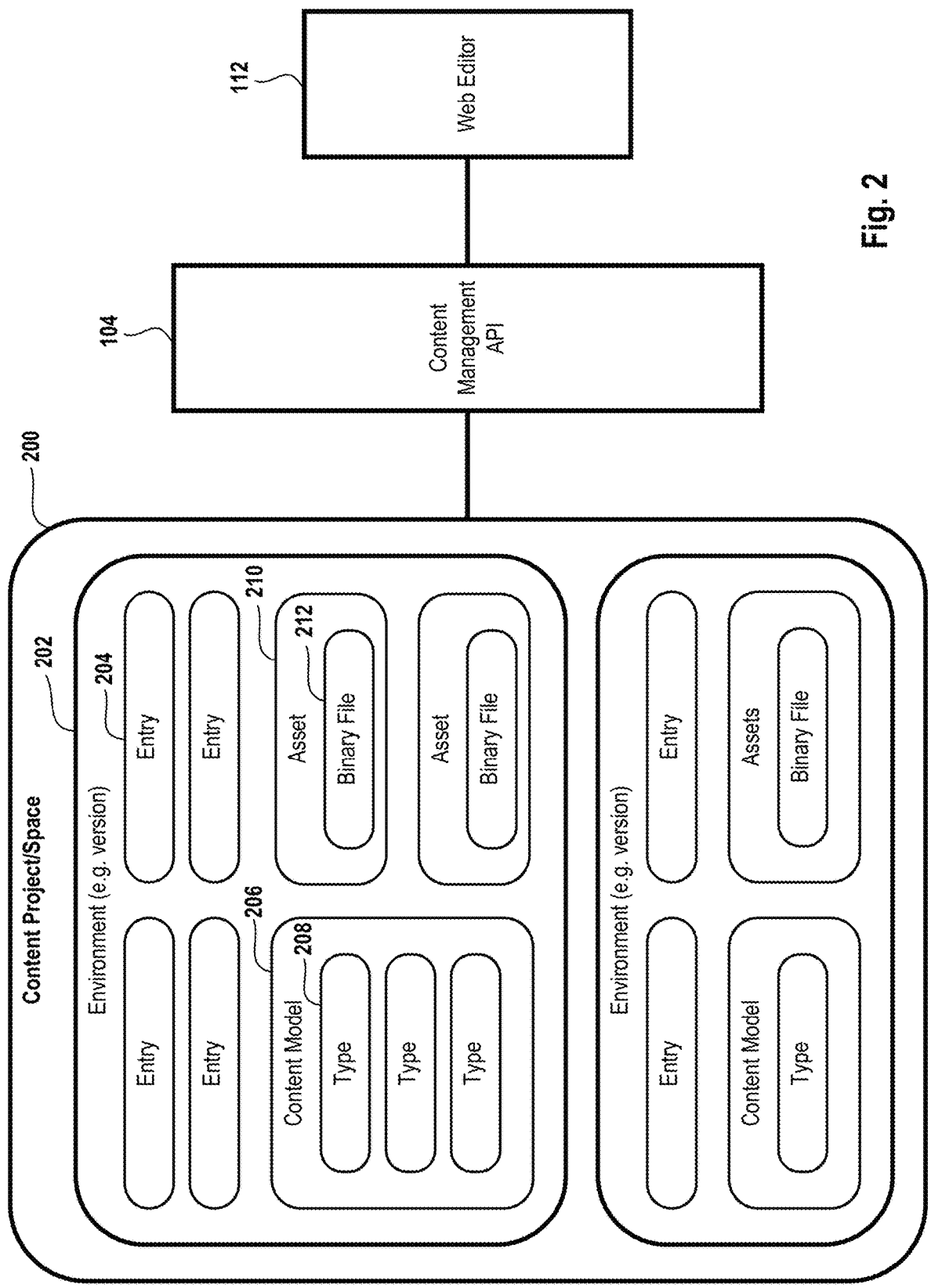
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g. system properties, name of the content type, description of the content type, listing of fields, ID of main field used for display, etc.). Each content type is flexibly configurable, further consisting of user-defined fields, which in some implementations, correspond to a JSON type (e.g. string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g. entry 204), which represent textual or structural information based on the content type used. Items can also be assets (e.g. asset 210), which can include binary files (e.g. binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g. only allow Menu Items for fields.menuItems). Asset links can be validated by file type. (e.g. only allow Images for fields.photo). Links on the Content Delivery API are resolved using the published entries and assets, while links on the Content Preview API will resolve using the draft entries and assets.

The concept of annotations in a CMS is herein introduced. Broadly speaking, annotations provide a flexible mechanism to attach semantic metadata to objects in a CMS's modeled context, allowing the specification of non-content data that client applications can interpret and use to adjust their behavior accordingly. This enables customers of the CMS to, for example, attach auxiliary and heterogeneous information to describe, in a human- and machine-readable format, entities in their spaces through a shared and backwards-compatible format. Customers can also prepare their modeled context according to the expectations of a pre-made or custom service without the need to rearrange or modify the content model. In particular, applications that are only part of content editing/releasing flows could be conveniently used in established, complex, content structures, relieving users from strong migration pain.

Throughout the present disclosure, reference is made to content types and content entries, the content entries being defined from, and having the type of, specific content types. Therefore, it will be appreciated that a description pertaining to a particular content type can also pertain to a content entry that is of that content type, and the terms can often be used interchangeably, though they are understood to be distinct entities as has been described.

Figure 3:
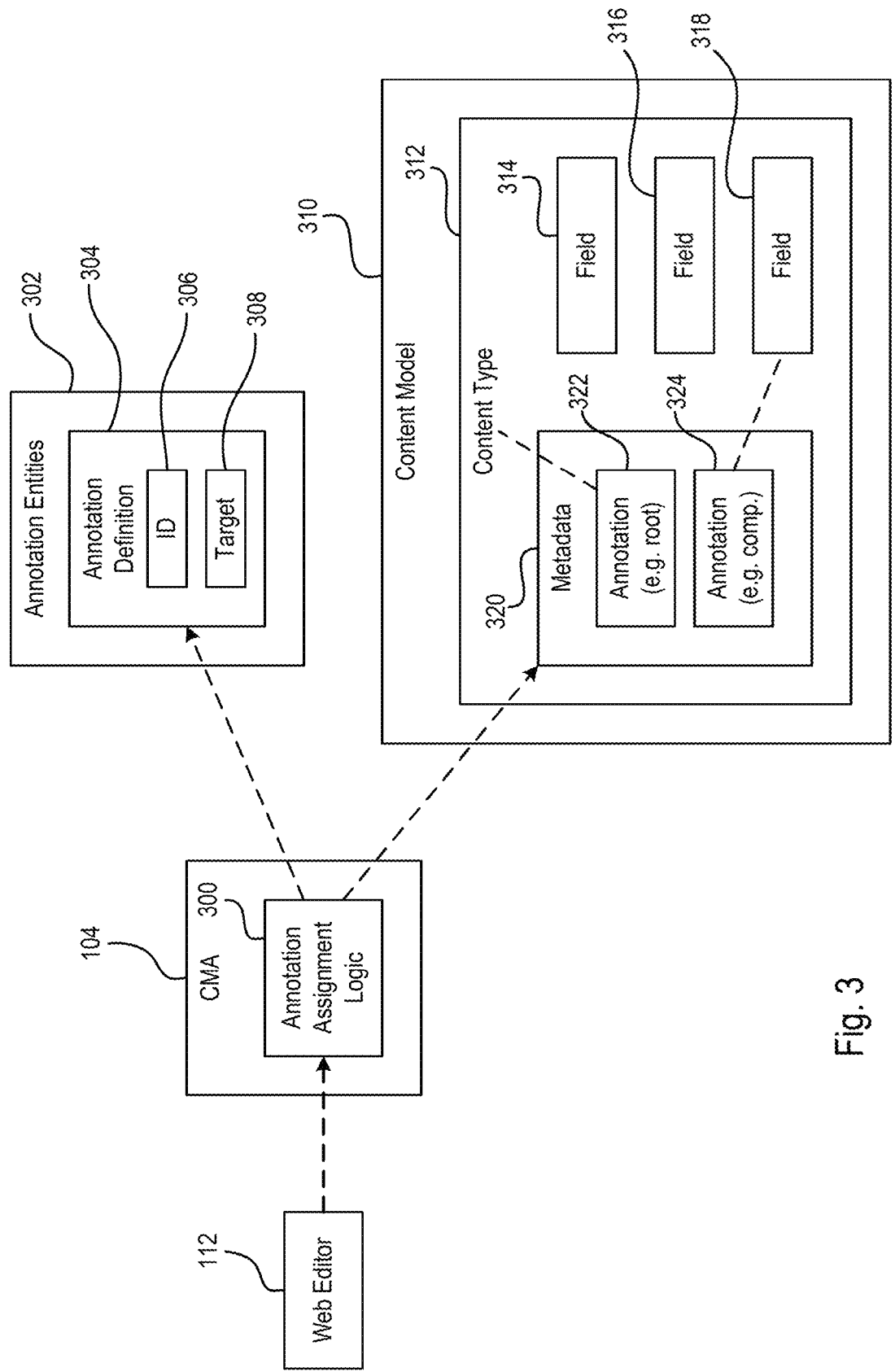
FIG. 3 conceptually illustrates assignment of an annotation to a content type of a content model in a content management system, in accordance with implementations of the disclosure.

FIG. 3 conceptually illustrates assignment of an annotation to a content type of a content model in a content management system, in accordance with implementations of the disclosure.

An existing content model 310 includes various content types such as the content type 312 shown by way of illustration. The content type 312 further defines various fields 314, 316, and 318.

A set of annotation entities 302 defines the various types of annotations which can be assigned to content types or subfields of the content types in the content model 310. The annotation entities 302 include various annotation definitions such as the annotation definition 304. As shown, the annotation definition 304 includes the ID 306 which defines the name of a particular annotation as well as the target 308 which specifies the types of entities to which that annotation may be assigned (e.g. a content type, a field type, etc.).

To assign an annotation to an entity, annotation assignment logic 300 is accessed through the content management API 104. By way of example without limitation, an application such as the web editor 112 can be configured to provide an interface for the assignment of annotations. Upon request, the annotation assignment logic 300 accesses a given annotation definition and assigns the annotation to a selected entity.

In the illustrated implementation, annotations are added to the content type 312. When an annotation is added to the content type 312 for the first time, a metadata object 320 is created for the content type 312. The annotations 322 and 324 are added as part of the metadata 320 in the content type 312, and defined according to their respective annotation definitions. In some implementations, an annotation can be assigned to specific target entities in accordance with the annotation's definition as noted above. For example, the annotation 322 may be configured to be assigned to content types of a content model, such as to the content type 312 itself. Whereas, the annotation 324 may be configured to be assignable to fields of a content type, such as the field 318 by way of example.

Annotations exist as independent entities that can be linked to a target that satisfies its definition. For purposes of illustrating one implementation of annotations, below is a sample code listing providing annotation definition examples, by way of example without limitation, for an "AggregateRoot" annotation and an "AggregateComponent" annotation:

```
[
  {
    sys: {
      id: "Contentful:AggregateRoot",
      type: "Annotation",
      version: 1,
      classification: "system"
    },
    targets: [
      {
        type: "ContentType"
      }
    ]
  },
  {
    sys: {
      id: "Contentful:AggregateComponent",
      type: "Annotation",
      version: 1,
    },
    classification: "system",
    targets: [
      {
        type: "ContentTypeField",
        accept: [
          { type: "Link" },
          {
            type: "Array",
            items: {
              type: "Link"
            }
          }
        ]
      }
    ]
  }
]
```

The following is a description of properties of the above code listing:

sys identifies the entity given its id and type.

sys.id uniquely identifies the annotation definition among others. To avoid name clashes and increase recognizability, softly namespaced ids are allowed. The colon: separator keeps the id url-safe sys.type "Annotation"

sys.version integer auto-incrementing on any update sys.classification describes whether the annotation definition is provided by the CMS or is user-created.

targets lists the locations (targets) where the annotation can be assigned targets.{idx}.type describes the type of entity the annotation can be assigned to. In the above, two target types are available: "ContentTypeField" and "ContentType".

targets.{idx}.accept optional, specifies the requirements that the target must satisfy to be assigned the annotation. The target is valid if it matches any of the item, i.e. every value at any path in the accept item equals the value at that path in the target.

Annotations can be assigned by linking the annotation entity with the chosen target. In some implementations, assignments are managed through the CMA 114. Below is an example code listing, by way of example without limitation, demonstrating assignment of annotations in a content type as follows:

```
// content type entity
{
  ...,
  fields: [
    ...,
    {
```

```
      id: "seo",
      type: "Link",
      linkType: "Entry",
      validations: [
        { linkContentType: [ "seo_metadata" ] }
      ],
    },
    {
      id: "hero",
      type "Link",
      linkType: "Entry",
      validations: [
        { linkContentType: [ "book" ] }
      ],
    },
    {
      id: "sections",
      type: "Array",
      items: {
        type: "Link",
        linkType: "Entry",
        validations: [
          {
            linkContentType: [
              "section_a",
              "section_b",
              "section_c"
            ]
          }
        ],
      }
    },
  ],
  metadata: {
    annotations: {
      ContentType: [
        {
          sys: {
            id: "Contentful: AggregateRoot",
            type: "Link",
            linkType: "Annotation"
          }
        }
      ],
      ContentTypeField: {
        seo: [
          {
            sys: {
              id: "Contentful:AggregateComponent",
              type: "Link",
              linkType: "Annotation"
            }
          }
        ],
        sections: [
          {
            sys: {
              id: "Contentful:AggregateComponent",
              type: "Link",
              linkType: "Annotation"
            }
          }
        ],
      }
    }
  }
}
```

In the above, the "AggregateRoot" annotation is assigned to the content type itself, whereas the "AggregateComponent" annotation is assigned to the "seo" and "sections" fields of the content type.

Below is a description of properties pertaining to the above code listing:

metadata is introduced as a new property at the content type entity root.

metadata.annotations contains annotation assignments for the content type, grouped by target types.

metadata.annotations.ContentType lists assignments targeting the content type.

metadata.annotations.ContentTypeField contains annotation assignments targeting content type fields, grouped by field id's.

metadata, metadata.annotations, metadata.annotations.ContentType, metadata.annotations.ContentTypeFields are optional.

In some implementations, each assignment item consists of a link object pointing at an annotation entity, with the following properties:

sys, object required:
id, string required: the identifier of an existing annotation
type is "Link"
linkType is "Annotation"

It will be appreciated that the API ensures coherence between annotation assignments and annotation definitions.

The foregoing listings of code and corresponding property descriptions are provided by way of example, without limitation, for purposes of illustrating certain implementations of annotations in a CMS. It will be appreciated that the principles embodied therein, including those pertaining to the definition and assignment of annotations, may be applied to other implementations in accordance with the present disclosure. While certain mechanisms for assignment of annotations to content types are presently described, it will be appreciated that other mechanisms are possible without departing from the scope of the present disclosure. For example, in other implementations, annotations can be assigned to a metadata object using a property name called "annotations" on the content type, or a direct property on the content type or content type field definition. Additionally, while the term "annotation" is used in the present disclosure, it will be appreciated that other terms may be substituted, such as "marker," "tag," etc., provided that such are configured to implement the functionality of an annotation as described herein.

Figure 4:
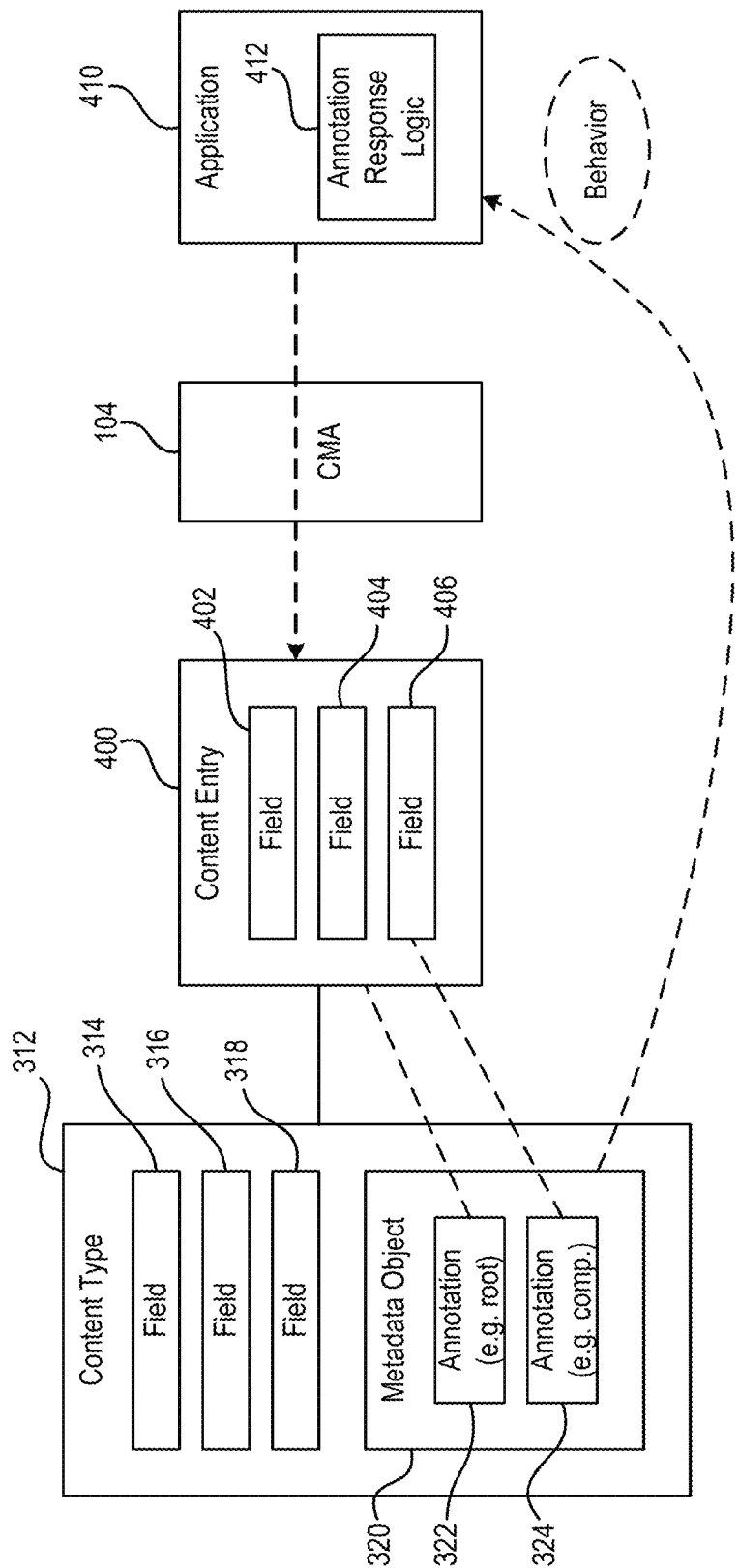
FIG. 4 conceptually illustrates the use of annotations to drive the behavior of an application accessing content of a CMS, in accordance with implementations of the disclosure.

FIG. 4 conceptually illustrates the use of annotations to drive the behavior of an application accessing content of a CMS, in accordance with implementations of the disclosure.

In the illustrated implementation, the content type 312 is shown, for which annotations have been assigned as previously described. More specifically, the annotation 322 is assigned to the content type 312 itself, and the annotation 324 is assigned to the field 318 of the content type 312. In the context of the CMS, the content types of a content model set forth the structures that will be used for structuring content managed via the CMS. More specifically, content entries are defined from content types, with each content entry having the structures defined by its corresponding content type from which it is defined. Content is stored to the fields of content entries, and retrieved from these fields for delivery to presentation contexts.

In the illustrated implementation, a content entry 400 is defined from the content type 312. Accordingly, the content entry 400 includes fields 402, 404, and 406 which are defined in accordance with the fields 314, 316, and 318, respectively, of the content type 312. It will be appreciated that the annotations assigned to the content type 312 apply to the content entry 400, as the content entry 400 is of a type defined by the content type 312. Thus, the annotation 322 applies to the content entry 400 itself, whereas the annotation 324 applies to the field 406 of the content entry 400.

In some implementations, annotations can be used to drive the behavior of an application 410 which accesses the content entry 400 through API calls to the CMA 104. For example, the application 410 may include annotation response logic 412, which is configured to identify and respond to the presence/assignment of a given annotation as applied to a content entry or subfield thereof. That is, when the annotation response logic 412 identifies a content entry whose corresponding content type has annotation(s) assigned, then the annotation response logic 412 is configured to perform some action or adjust its behavior based on the annotation and the entity to which the annotation is assigned (e.g. content of a specific field to which the annotation is assigned).

By way of example without limitation, in some implementations, the application 410 is an editing application for editing content of the CMS. For example, the application 410 may access through the CMA 104 the fields of the content entry 400 for editing. In some implementations, the annotations assigned to a given field are used by the application 410 to determine a behavior of the application, such as determining how content of the field is rendered in a user interface of the application 410 for editing. In other implementations, the effects of an annotation can go beyond affecting interface presentation, and may extend to other types of behavior on the part of the application 410, such as automatic adjustment/edits/filling of content in a field, duplication behavior, automatic naming behavior, etc.

Figure 5:
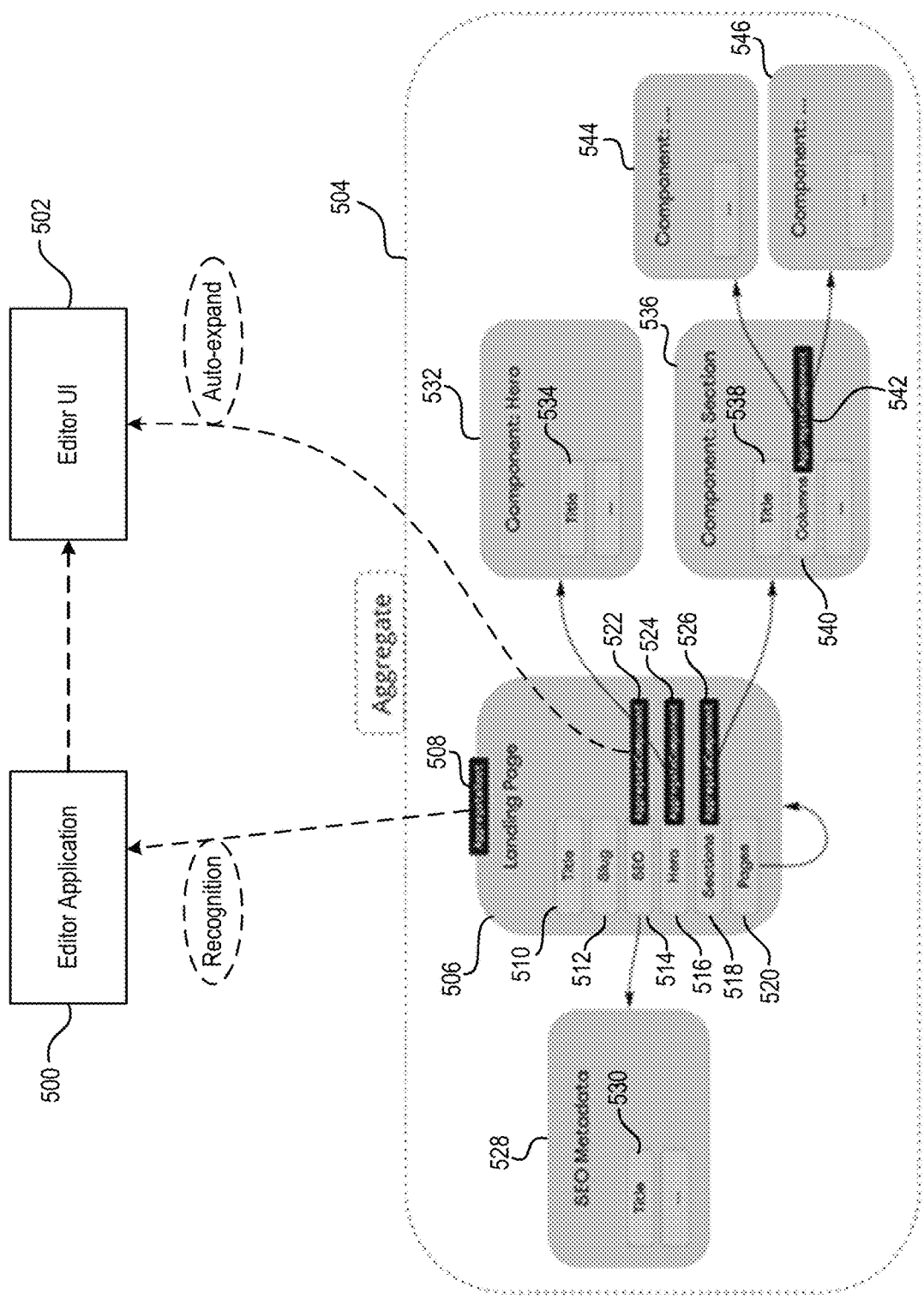
FIG. 5 conceptually illustrates assignment of annotations in a CMS for enabling editing functionality of an editor application, in accordance with implementations of the disclosure.

FIG. 5 conceptually illustrates assignment of annotations in a CMS for enabling editing functionality of an editor application, in accordance with implementations of the disclosure.

In the illustrated implementation, annotations are implemented to define an aggregate 504 of content types for use with an editor application 500. An example of an editor application 500 is described, by way of example without limitation, with reference to U.S. application Ser. No. 17/201,348, filed Mar. 15, 2021, entitled "METHODS FOR EXECUTING AN EDITOR APPLICATION FOR COMPOSING CONTENT OF A CONTENT MANAGEMENT SYSTEM," the disclosure of which is incorporated by reference herein. Broadly speaking, an aggregate is a collection of entities recognized as a unit or collective group for purposes of the editor application's functionality. As discussed in further detail below, an aggregate of content types can be identified by assignment of annotations to content types.

In the illustrated implementation, various content types 506, 528, 532, 536, 544, and 546 are included in an existing content model. By way of example without limitation, the content type 506 is a "Landing Page" content type having a "Title" field 510, a "Slug" field 512, an "SEO" field 514, a "Hero" field 516, a "Sections" field 518, and a "Pages" field 520. The "SEO" field 514 is a reference/link type field that may reference an "SEO Metadata" content type 528, which includes a "Title" field 530. The "Hero" field 516 is a reference/link field that may reference a "Component: Hero" content type 532, which includes a "Title" field 534. The "Sections" field 518 is a reference/link field that may reference a "Component: Section" content type 536. The "Pages" field 520 is a reference/link field that may reference other entries of the content type 506. The "Component: Section" content type 536 includes a "Title" field 538 as well as a "Columns" field 540, which is a reference/link field which may reference other "Component" content types 544 and 546.

In the illustrated implementation, an "AggregateRoot" annotation is assigned to the "Landing Page" content type 506. The assignment of the "AggregateRoot" annotation is configured to identify the "Landing Page" content type 506 as the root of an aggregate for purposes of the editor application 500. In some implementations, the "AggregateRoot" annotation enables recognition of the content type 506, as well as the content types to which the content type 506 may link, for editing using the editor application. That is, the assignment of the "AggregateRoot" annotation is recognized by the editor application, and interpreted thereby to enable editing functionality provided by the editor application. For example, the recognition of the content types in this manner enables their representation in an editor user interface 502 provided by the editor application 500, with the content type 506 organized as the root of an aggregate in the editor user interface 502.

An "AggregateComponent" annotation is assignable to reference/link type fields, to indicate that the referenced/ linked entities of such fields are members of the aggregate, and can be configured to drive certain behaviors of the editor application 500. In the illustrated implementation, the "SEO" field 522 is assigned the "AggregateComponent" annotation 522, the "Hero" field 516 is assigned the "AggregateComponent" annotation 524, the "Sections" field 518 is assigned the "AggregateComponent" annotation 526, and the "Columns" field 540 is assigned the "AggregateComponent" annotation 542.

As noted, the assignment of the "AggregateComponent" annotation identifies the referenced entity as part of the aggregate. Thus in the case of the "SEO" field 514, the referenced "SEO Metadata" content type 528 is identified as an included component of the aggregate. Whereas in the case of the "Pages" field 520 which does not have the "AggregateComponent" annotation, an entry referenced by the "Pages" field 520 would not be identified as a part of the aggregate.

In some implementations, the "AggregateComponent" annotation can be used to determine default editing behavior in the editor user interface 502. For example, the "AggregateComponent" annotation can be configured to trigger an automatically expanded view of an entity referenced by a field to which the "AggregateComponent" annotation is assigned. In some implementations, such auto-expansion provides viewing of components of the entity in a tree view, and/or viewing of the components of the entity in an expanded view in an editing window that enables direct editing of their contents. An example demonstrating such editing behavior is provided and discussed further below.

In some implementations, another behavior of the editor application that can be controlled using annotations is that of duplication. Duplication of a content entry having fields that reference other content entries can be difficult because it may not be clear which referenced entries should also be duplicated and which should not. However, annotations defining an aggregate as discussed can be utilized to inform duplication behavior.

Figure 6:
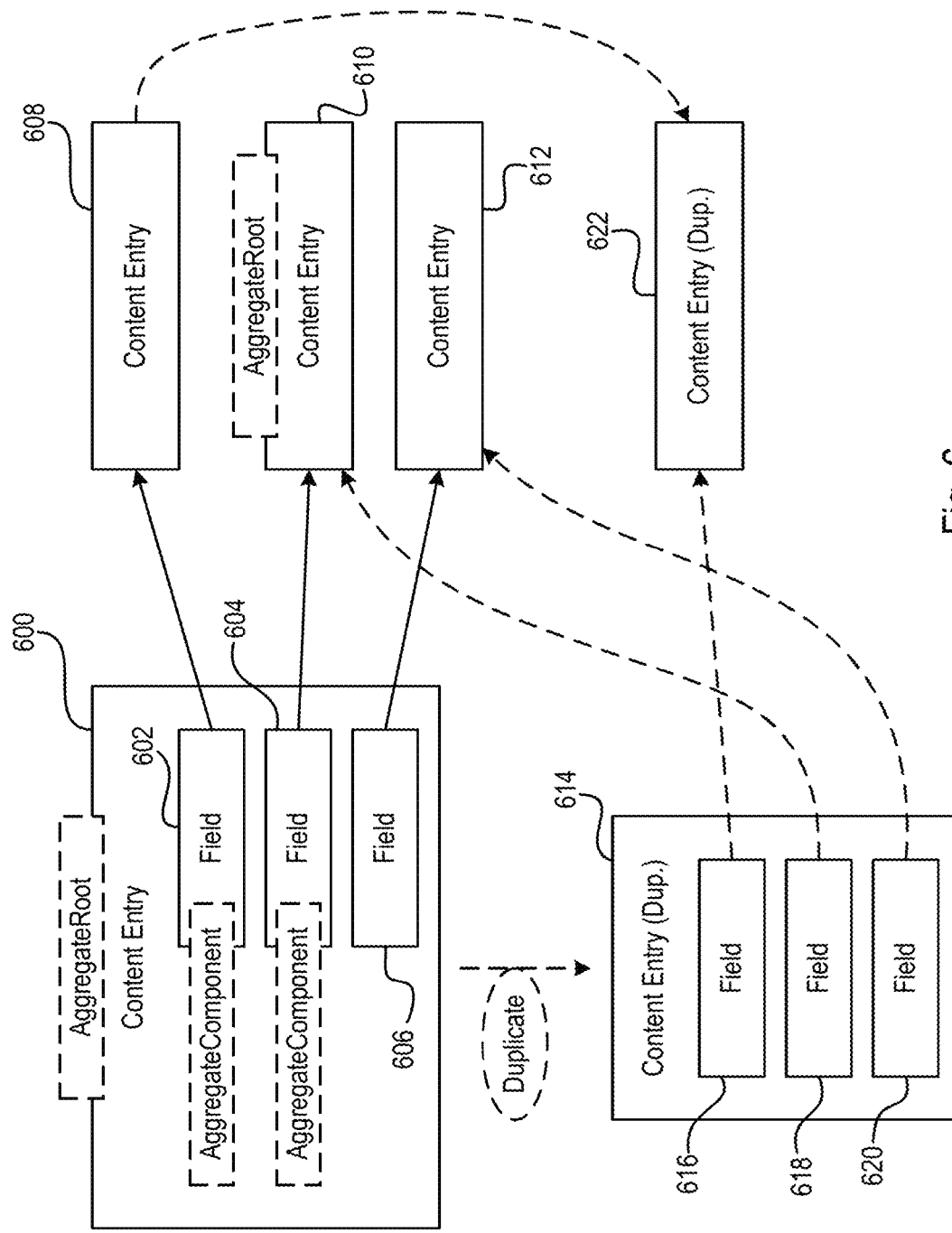
FIG. 6 conceptually illustrates duplication of a content entry based on annotations defining an aggregate, in accordance with implementations of the disclosure.

FIG. 6 conceptually illustrates duplication of a content entry based on annotations defining an aggregate, in accordance with implementations of the disclosure.

As discussed above, annotations are assigned to content types of a content model, and content entries are defined from the content types. Therefore, a specific annotation for a given content type also applies to a content entry of the specific content type. As the annotation can be used to drive behavior in relation to management/editing of content entries, for ease of description, reference will be made to content entries having certain annotations associated/assigned thereto. However, it will be appreciated that the annotations are assigned to the relevant content type of a given content entry, and therefore apply to the content entry by extension.

In the illustrated implementation, the content entry 600 includes various reference/link fields 602, 604, and 606. As indicated, the content entry 600 (or rather, its content type) is assigned the "AggregateRoot" annotation, and the fields 602 and 604 (or rather, the fields of the content type) are assigned the "AggregateComponent" annotation. Field 602 references content entry 608; field 604 references content entry 610; and, field 606 references content entry 612. Content entry 610 is assigned the "AggregateRoot" annotation.

In some implementations, when a content entry is duplicated, if the "AggregateComponent" annotation is assigned to a reference field, then the component referenced by that field is also duplicated. For example, in the illustrated implementation, an operation to duplicate the content entry 600 is initiated, for example, in response to user input received through the user interface of the editor application. A copy of the content entry 600 is created as a new content entry 614, which has fields 616, 618, and 620 corresponding to the fields 602, 604, and 606 of the original content entry 600. Because the field 602 is assigned the "AggregateComponent" annotation, then the system also creates a duplicate of the content entry 608 as a new content entry 622. The field 616 is configured to reference the new content entry 622.

By contrast, the "AggregateComponent" annotation is not assigned to the field 606, and therefore its referenced content entry 612 is not also duplicated. The corresponding field 620 thus references the content entry 612, which is the same as the field 606 of the original content entry 600.

In some implementations, a content entry that is assigned the "AggregateRoot" annotation is not duplicated even if it is referenced by a field assigned the "AggregateComponent" annotation. In the illustrated implementation, the content entry 610 is assigned the "AggregateRoot" annotation as indicated. Therefore, the content entry 610 is not duplicated when the content entry 600 is duplicated, even though the field 604 is assigned the "AggregateComponent" annotation. In some implementations, the above-described auto-expansion behavior is similarly configured, in that if a field is pointing to an entry having the "AggregateRoot" annotation assigned, then the entry is not auto-expanded in the tree view. Hence, the "AggregateRoot" annotation is configured to provide a boundary on both duplication and auto-expansion behavior.

In other implementations, the content entry 610 can be automatically expanded in an editing context for a reference field, but not duplicated automatically when the referencing field is duplicated.

In some implementations, automatic naming of a duplicated content entry is implemented. For example, when a referenced content entry is duplicated (e.g. in response to being assigned the "AggregateComponent" annotation), then the duplicate entry may be automatically named according to a predefined logical convention, such as based on the name of the relevant content type, the parent content entry name, etc.

In some implementations, an application (such as an editor application for editing content in the CMS) may require adherence to a specific content model. However, many customers of the CMS may have an existing content model that is not compatible with the editor application, as they were not originally developed with the application. Therefore, adapting their content model and associated content entries for use with the application may require a large migration project, which is difficult and risky. Furthermore, even if customers create a project using the application, they are still bound by the restrictions imposed by the specific content model that is required by the application.

However, annotations as described herein can provide a solution to these problems, enabling adaptation of an existing content model for use with a given application. The annotations can be configured to identify to the application the nature of the content types of the existing content model, effectively translating and enabling an understanding of the content types for the application so that the application understands how to treat the content types even though they do not adhere to the application's default content model specifications.

Figure 7A:
FIG. 7A illustrates an interface for setting content types for use with an editor application, in accordance with implementations of the disclosure.

FIG. 7A illustrates an interface for setting content types for use with an editor application, in accordance with implementations of the disclosure.

In the illustrated implementation, a listing 700 of content types of an existing content model is shown. One example of an editor application is the Compose app published by Contentful GMBH for editing content managed via the Contentful CMS. In the illustrated implementation, content types can be selected for use with the Compose app. For example, the "Recipe" content type listed at reference 702 can be selected for use with the Compose app by clicking on the "Use in Compose" selectable text 704. This initiates a process by which the AggregateRoot and AggregateComponent annotations previously discussed can be assigned to the "Recipe" content type. If the AggregateRoot annotation is assigned, then the "Recipe" content type will be identified as the root of an aggregate. More specifically, in the context of the Compose app, the root of an aggregate is considered to be a "page." Accordingly, the "Recipe" content type will be considered to be a "page" type in the context of the Compose app. (It will be appreciated that assignment of the AggregateRoot annotation is not a prerequisite for assignment of other annotations such as the AggregateComponent annotation, for which an example interface is described below.)

Figure 7B:
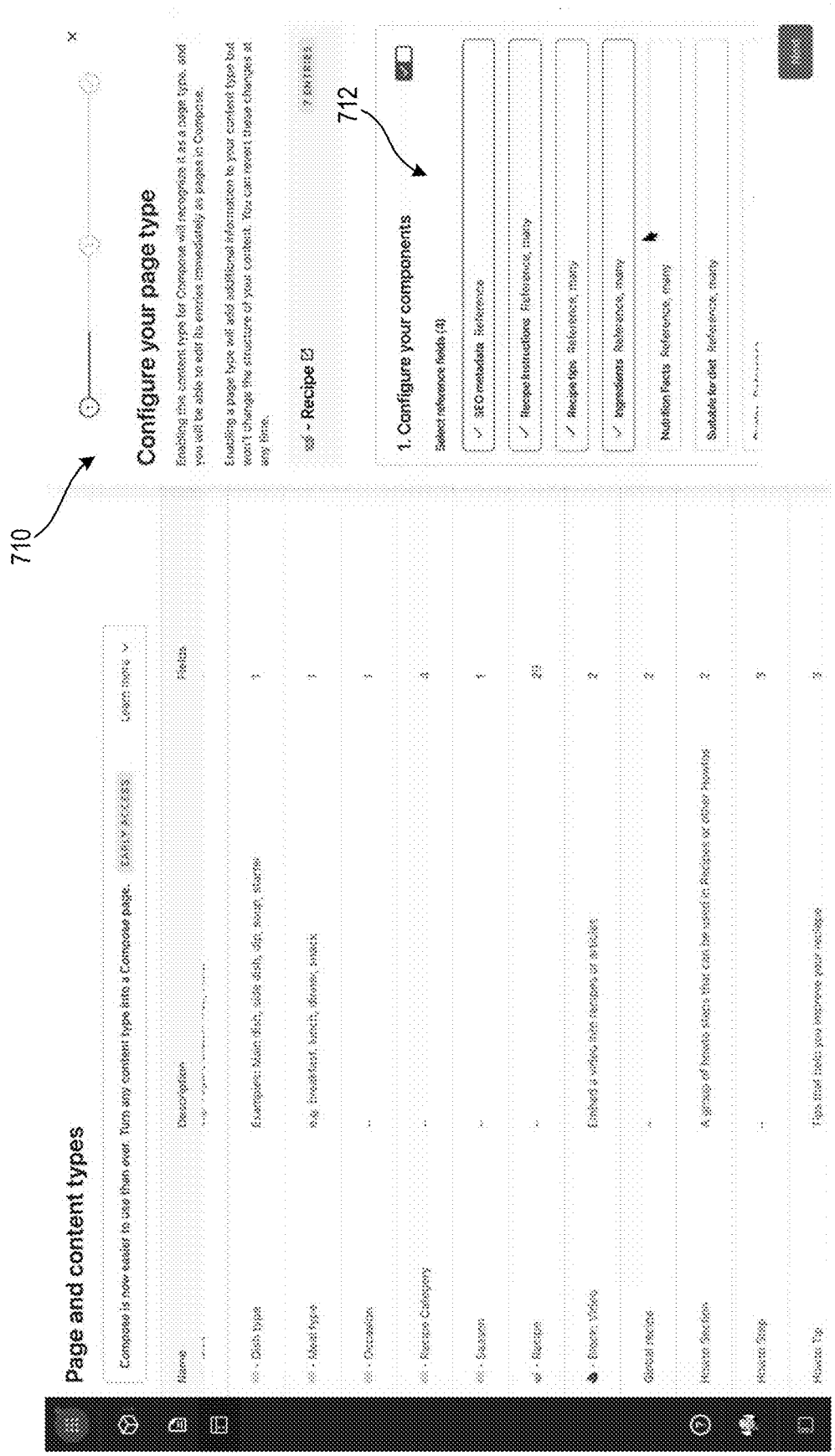
FIG. 7B illustrates an interface for setting components of an aggregate, in accordance with the implementation of FIG. 7A.

FIG. 7B illustrates an interface for setting components of an aggregate, in accordance with the implementation of FIG. 7A.

In the illustrated implementation, a pop-out configuration interface 710 is shown, which enables setting of reference fields as components of the aggregate. A listing of reference fields 712 of the previously selected "Recipe" content type is shown. Of these, the "SEO metadata," "Recipe Instructions," "Recipe tips," and "Ingredients" fields have been selected for configuration as components of the aggregate for which the root is the "Recipe" content type. Completion of the process assigns the "AggregateRoot" annotation to the "Recipe" content type, and further assigns the "AggregateComponent" annotation to the "SEO metadata," "Recipe Instructions," "Recipe tips," and "Ingredients" fields.

Figure 7C:
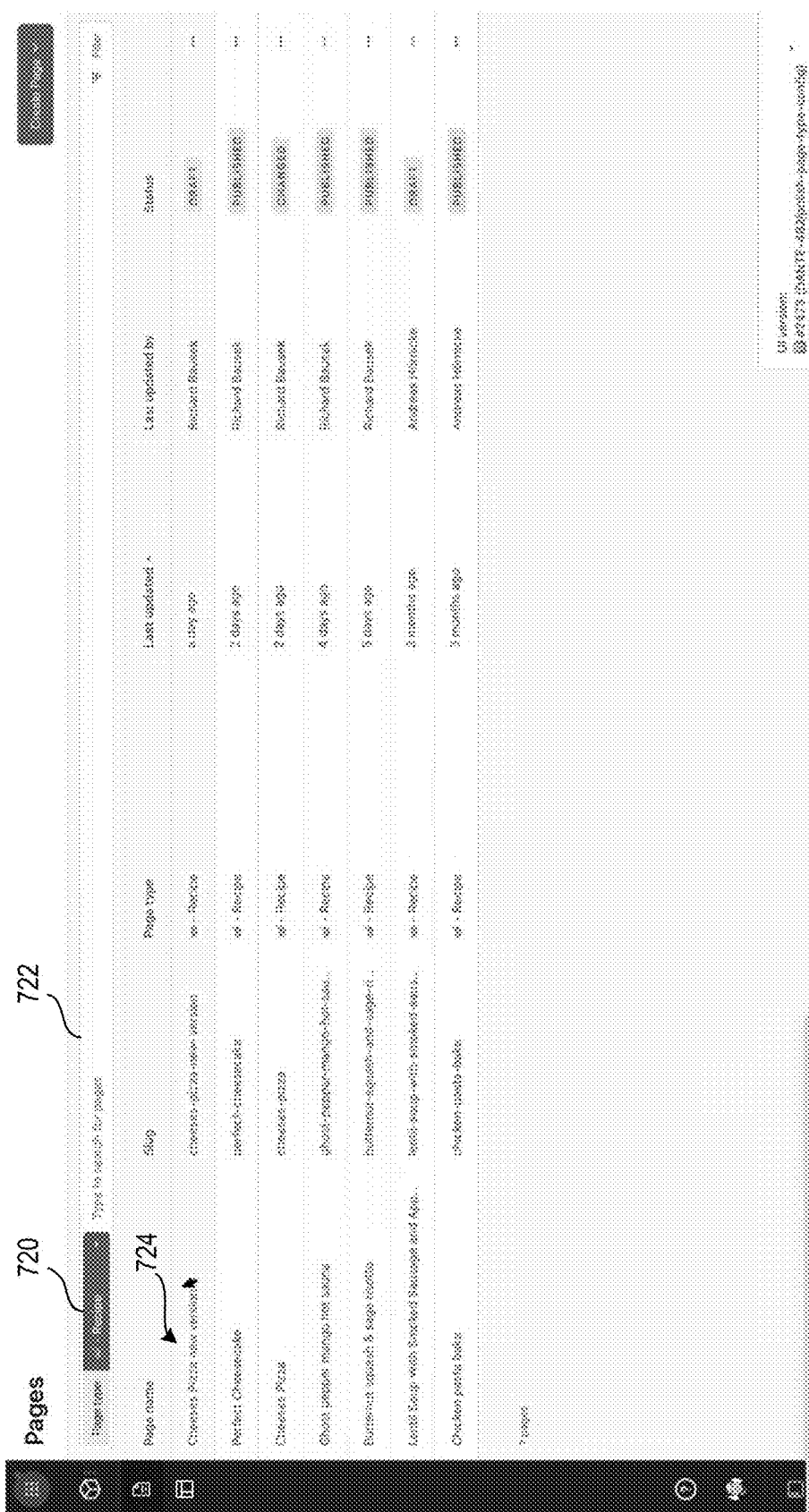
FIG. 7C illustrates an interface for selecting a given content entry for editing in the Compose app, in accordance with the implementation of FIG. 7B.

FIG. 7C illustrates an interface for selecting a given content entry for editing in the Compose app, in accordance with the implementation of FIG. 7B.

In the illustrated implementation, a page type selector 720 is shown set to the "Recipe" content type, which as noted above is identified as a page type as it is the root of an aggregate because it has an assigned "AggregateRoot" annotation. In general, the page type selector will list all content types that are identified as page types via an assignment of the "AggregateRoot" annotation. Accordingly, below is shown a listing of content entries of the "Recipe" page type which can be identified via the annotation assignment on its respective content type. A search field 722 enables searching for pages (root entries). For example, in the illustrated implementation, a "Cheeses Pizza new version" content entry shown at reference 724 is selectable for editing.

Figure 7D:
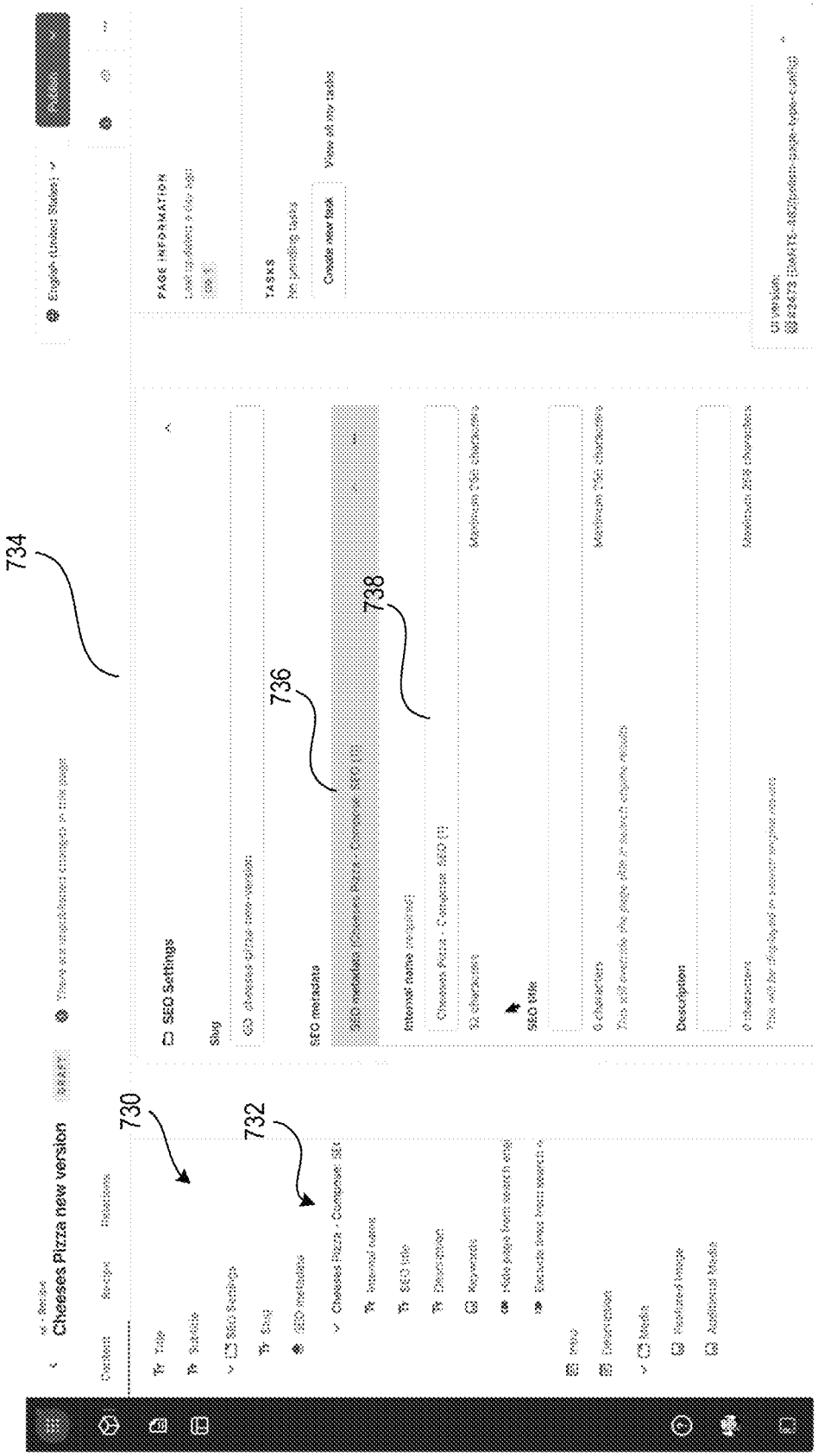
FIG. 7D illustrates an interface for editing content, in accordance with the implementation of FIG. 7C.

FIG. 7D illustrates an interface for editing content, in accordance with the implementation of FIG. 7C.

In the illustrated implementation, an interface of the Compose app for editing content of the "Cheeses Pizza new version" content entry is shown. Displayed at left is a hierarchical tree view showing fields of the "Cheeses Pizza new version" content type in a hierarchical arrangement. For example, the "SEO metadata" field is displayed at reference 732 in an automatically expanded configuration within the hierarchical tree, as the SEO metadata field was selected for inclusion as a component of the aggregate, assigning the AggregateComponent annotation thereto.

Shown at right is an editing view 734 which permits editing of the contents of fields of the selected content entry (the "Cheese Pizza new version" content entry). Because the SEO metadata field has been assigned the AggregateComponent annotation as previously described, then in the editing view 734, the SEO metadata field is shown by default in an expanded configuration permitting direct editing of the fields, such as the "internal name" field 738 by way of example.

Thus, as shown, a customer of the CMS is able to use their existing content model with the Compose app without modifying the structure or naming of the content types. By extension, downstream applications such as front-end applications which may rely on the existing content model, do not need to be changed. The customer is able to gain access to the interface features of the Compose app through the use of annotations, which identify the root of an aggregate within the existing content model, and also identify which referenced entities are components of the aggregate. These definitions within the existing content model are utilized to enable the Compose app to understand how to render various content entries for editing, and also drive/adjust behavior such as auto-expansion viewing and duplication behavior.

It will be appreciated that the presently described implementation of annotations in the CMS context is to be distinguished from other types of annotations which are definitions in the programming language. In the present implementations, it is the structure of the content itself that is annotated, such that annotations provide a way to layer more structured information on the content structure that has been defined by the content type. And this is something that can be transmitted to other systems to adjust those systems' behavior.

In further implementations, a given annotation can include additional settings which can be used to further adjust the behavior of an application that uses the annotation. In some implementations, these settings can take the form of binary settings, variable values, strings, etc., which can be defined by the annotation definition. During assignment of an annotation, then the values of such settings can be set, for example, in response to user input/selection.

While certain implementations of annotations have been described in detail, it will be appreciated that other uses of annotations in a CMS are envisioned.

For example, in some implementations, an AggregateRoot annotation can be used to define boundaries for pages for publication. Such annotations can be used to simplify manipulation of deeply nested content in a reference tree used for selecting content entries for publication (as described in U.S. Pat. No. 11,210,364, entitled "METHODS FOR LAUNCHING CONTENT FOR PUBLICATION," the disclosure of which is incorporated by reference herein), and to limit the scope of deep publishing to aggregates.

In some implementations, API endpoints can be defined as part of the CMA to enable direct creation/consumption/modification of a page via the CMA, without the need to go through a specific editor/UI. By way of example without limitation, an API for aggregates can be defined to read, update, publish and duplicate pages as a single entity.

In some implementations, aggregate root/component annotations can be used to support content automation for content editing in nested aggregates. By way of example without limitation, there can be automatic creation, deletion or naming of child components of an aggregate root.

In still further implementations, there can be additional annotation use cases in a content modeling context. For example, annotations can be used to define transformation instructions and transform output of the CMA to have a representation agnostic of the underlying CMS (e.g. Schema.org, custom GraphQL schemas).

In some implementations, annotations can be used to define relationships of content types to drive a graph representation of the content model (as opposed to a tree representation). For example, annotations can be used to identify nodes/edges of the graph representation.

In some implementations, annotations can be used to define granular rules for content localization behavior for content types and fields.

In some implementations, annotations can be used to mark content types to be derived from a managed shared content model template. For example, annotations may identify which content types are synchronized to which template.

In still further implementations, other use cases for annotations in a CMS context are envisioned. For example, in some implementations, annotation of projects (e.g. spaces or environments) is provided. This can be useful, for example, for large organizations to be able to annotate projects with team affiliation in order to map ownership of the projects.

In some implementations, annotations are used to annotate entities to be audited so organizations can granularly track content changes.

Figure 8:
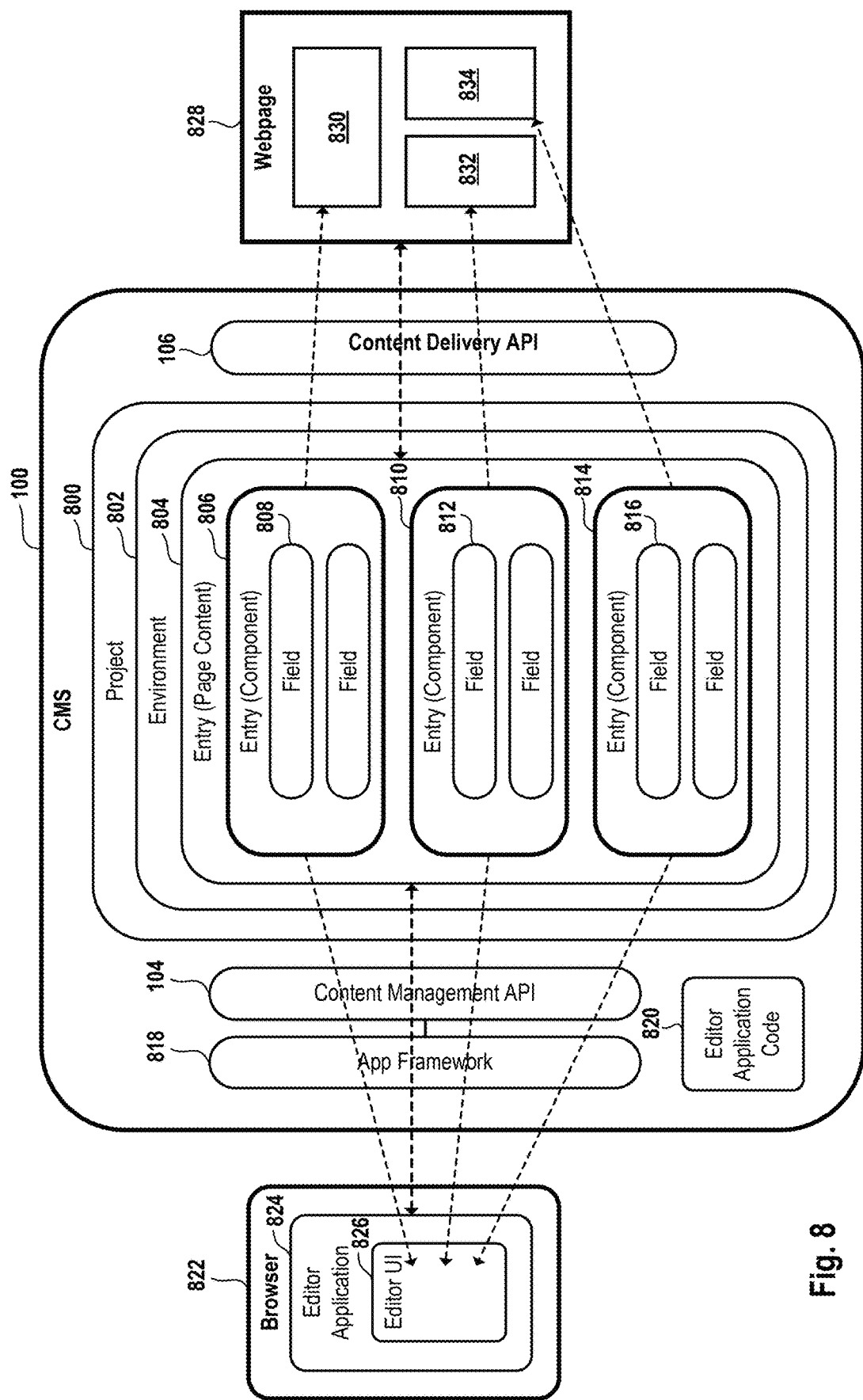
FIG. 8 conceptually illustrates a system for editing a page of content in a CMS, and rendering the page of content as a webpage, in accordance with implementations of the disclosure.

FIG. 8 conceptually illustrates a system for editing a page of content in a CMS, and rendering the page of content as a webpage, in accordance with implementations of the disclosure.

In some implementations, an editor application is configured to present content editing interfaces organized around the concept of a page in the CMS 100. In such implementations, a page (or a CMS page, content page, or a page of content) in the CMS, is a set of data structures defined and stored in the CMS that identifies and organizes a collection of content. It will be appreciated that a CMS page is specific to the CMS 100, and is to be distinguished from other types of pages such as webpages and the like which may represent downstream presentation contexts. As implied by the naming convention, one significant use of a CMS page is to enable content editors using the CMS 100 to model the logical structure and organization of content that is to be presented in a webpage context. However, the CMS page is an independently defined organizational structure in the CMS 100 that can be applied to suit other use cases and presentation contexts. A significant advantage of the implementation of a CMS page is that it enables content editors to more easily appreciate the downstream presentation context of content that they are editing in the CMS 100, while still maintaining the independence of the content from its potential presentation contexts.

In some implementations, a CMS page is defined using the above-described flexible content modeling architecture, employing entries that are defined and referentially nested so as to enable intuitive access and editing of content in the CMS 100. More specifically, in some implementations, a CMS page is defined by the content entry which content type has the "AggregateRoot" annotation assigned, and additional entries further referenced (directly, or indirectly via nesting of entries) on fields of that entry, which compose the content for the CMS page.

With continued reference to the implementation of FIG. 8, the CMS 100 is shown, including a content project 800, and an environment 802 defined within the content project 800, which as noted above can be defined to represent a version of the project 800. Within the environment 802, a page content entry 804 is defined for a given CMS page. The page content entry 804 is of a type that is configured to contain page specific properties and to organize blocks or sections of content which may be deployed to a webpage or other presentation context.

The page content entry 804 can reference several component entries 806, 810, and 814, as shown, which represent the content blocks for a webpage 828, for example. Each component entry includes one or more fields, such as field 808 of component entry 806, field 812 of component entry 810, or field 816 of component 814. These fields may directly contain content (e.g. text, values, etc.) or reference content such as assets/media or reference additional entries.

The CMS 100 includes editor application code 820, that can be downloaded over a network to a client device, and executed, for example via a browser 822 of the client device, to define an editor application 824. The editor application 824 provides an editor user interface (UI) 826 enabling an editor to access and edit content of the CMS 100. The editor application 824 may access an application framework 818 that assists or enables the editor application 824 to access the entries of content project 800, such as by facilitating API calls to the content management API 104 to retrieve entries, submit changes to entries, etc. An example of an application framework is described in U.S. Pat. No. 11,175,972, issued Nov. 16, 2021, entitled "APPLICATION FRAMEWORK FOR INTEGRATING APPS FOR EDITING CONTENT OF A CONTENT MANAGEMENT SYSTEM, the disclosure of which is incorporated by reference herein.

When published, the component entries of the CMS page can be made available for rendering through a presentation context such as webpage 828. It will be appreciated that the logical structuring of entries referenced by the page content entry 804, and attendant fields and nested sub-entries, can be configured so as to approximate the logical structure of the intended presentation context, which in this case is that of the webpage 828. A web developer may configure the webpage 828 to present content in specific ways, adjusting appearance and layouts as necessary, but the logical structuring of the content according to a CMS page in the CMS 100 provides a hierarchical framework that can approximate the logical structure of the webpage 828, making it simpler for the web developer to author the webpage 828. In the illustrated implementation, the component entries 806, 810, and 814 are arranged at locations 830, 832, and 834 of the webpage 828, which can be spatially defined locations of the webpage 828 in some implementations.

The content for the webpage 828 is retrieved from the CMS 100, e.g. by a browser of a client device in which the webpage is rendered, via one or more API calls to the content delivery API 106. In some implementations, the webpage 828 is cached for delivery at the edge by a content delivery network (CDN), in which case the entries of the CMS page may be retrieved by a server of the CDN, again via API calls to the content delivery API 106.

Traditional content management systems were designed to store and present content elements like text, images and video on websites. That is, the traditional CMS approach is to managing content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering it for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 9:
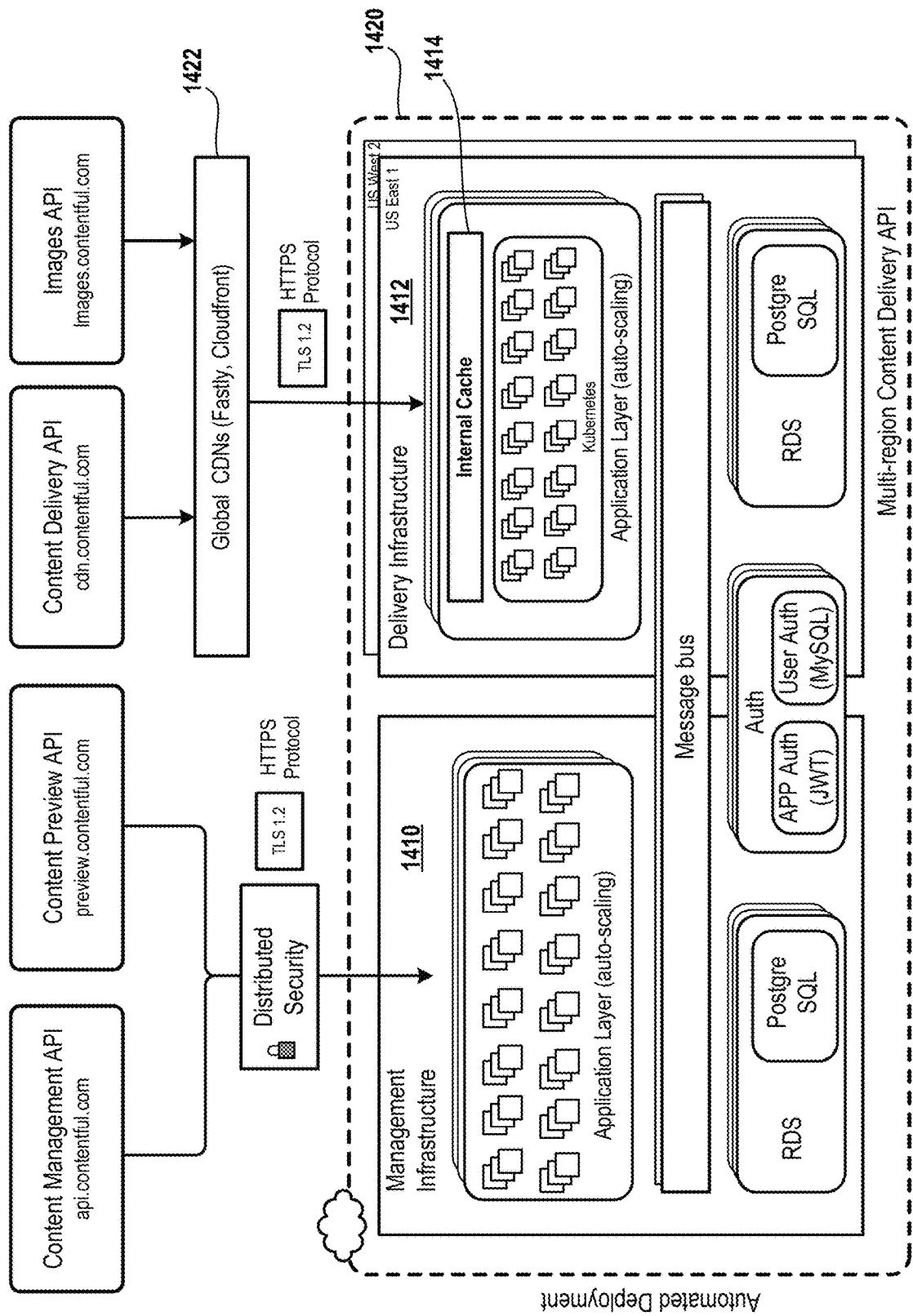
FIG. 9 illustrates an example of how a content management API (CMA) and a content preview API (CPA) can make calls to a content management system (CMS), in accordance with implementations of the disclosure.

FIG. 9 illustrates an example of how the content management API (CMA) and the content preview API (CPA) can make calls to the content management system (CMS) 1420. In one configuration, the CMS 1420 includes compute and storage resources for management of structured content. As described above, a web editor provides a user interface (UI) that remote client device uses to access the CMS 1420. Based on the type of content creation and/or editing being performed via the UI of the web editor, either the CMA or CPA are used to make API calls to the management 1410 compute and storage resources. The compute and storage resources which run the CMS 1420, in one embodiment, are run in a cloud-based environment. The cloud-based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third-party hosting services. In some configurations, the hardware configurations may include virtualized hardware and expandable storage to meet the processing needs of the CMS 1420. Broadly speaking, the CMS 1420 is executed using cloud infrastructure, which includes the use of multiple interconnected data centers throughout the world.

In one configuration, the CMS 1420 also includes a delivery component 1412, which is configured to service processing operations from the content delivery API and the images API. As shown, in one embodiment, the delivery component 1412 is provisioned with internal cache 1414, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1412 is part of the CMS 1420, and is also executed on compute and storage of a cloud infrastructure. In one embodiment, structured content is prepared and/or edited using the management component 1410, before it is published for external consumption. By separating structured content in the cloud infrastructure, it is possible to prevent non-ready content to be accessed and delivered using the CDA.

Agents accessing the CMS 1420, including organizations, individual users, as well as APPs, are authenticated by an authentication and authorization system. In some implementations, user authentication uses MySQL. In some implementations, APP authentication uses JSON Web Tokens.

It should be apparent, that the present embodiments may be practiced without some or all of these specific details. Modification to the modules, code and communication interfaces are also possible, so long as the defined functionality for the content management system (CMS) or modules of the CMS maintained. In other instances, well-known process operations have not been described in detail in order not to unnecessarily obscure the present embodiments.

One or more embodiments can also be fabricated as computer-readable code on a non-transitory computer-readable storage medium. The non-transitory computer-readable storage medium is any non-transitory data storage device that can store data, which can thereafter be read by a computer system. Examples of the non-transitory computer-readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include computer-readable storage medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A system comprising at least one server computer, said at least one server computer configured to perform a method for activating editing functionality in a content management system (CMS), said method including the following operations:

the CMS providing a content management application programming interface (CMA) enabling management of a content project, the content project having a content model defined by a plurality of content types, each content type defining one or more fields, said content types defining structures for content managed via the CMS;

wherein the content project further includes one or more content entries that are generated from said content types of the content model, so that the content entries are structured according to the content types so as to include fields according to the fields of the content types, and the fields of the content entries are used to store the content that is managed via the CMS, whereas the fields of the content types of the content model do not receive or store the content that is managed via the CMS;

responsive to an application programming interface (API) call to the CMA, then assigning one or more annotations to one or more of the content types of the content model, wherein assigning the one or more annotations includes creating a metadata object in a given content type of the content model and adding an annotation to the metadata object;

wherein for the content types of the content model having annotations assigned thereto, the assigned annotations activate an editing functionality of an editing application interfaced with the CMS for editing of the content entries, based on the annotations assigned to the content types of the content model from which the content entries are generated;

wherein the content entries are separate from the content types, such that the assignment of the annotations to the content types occurs independent of the content entries generated from said content types, and such that the annotations assigned to the content types are not assigned to the content entries generated from said content types so that metadata objects created for respective annotations of said content types are not associated to the content entries generated from said content types.

2. The system of claim 1, wherein the annotation identifies the given content type as a target of the annotation.

3. The system of claim 1, wherein the annotation identifies a field of the given content type as a target of the annotation.

4. The system of claim 1, wherein the annotations include an annotation enabling recognition of the given content type for editing by the editing application.

5. The system of claim 4, wherein the annotation enabling recognition of the given content type identifies the given content type as a root of an aggregate for the editing application.

6. The system of claim 1, wherein the annotations include an annotation enabling an automatic display behavior of a field of the given content type.

7. The system of claim 6, wherein the automatic display behavior includes automatic expansion of components of the field of the given content type in a tree view provided by the editing application that provides a hierarchical view of the content types.

8. The system of claim 6, wherein the automatic display behavior includes automatic expansion of components of the field of the given content type for editing in an editing view provided by the editing application that enables editing of contents of the field.

9. The system of claim 1, wherein the API call to the CMA is in response to input received through a web editor of the CMS, the web editor being separate from the editing application.

10. The system of claim 1, wherein the annotations enable the editing functionality of the editing application without altering the structures defined by the content types for the content managed via the CMS.

11. A system comprising at least one server computer, said at least one server computer configured to perform a method for activating editing functionality in a content management system (CMS), said method including the following operations:

the CMS providing a content management application programming interface (CMA) enabling management of a content project, the content project having a content model defined by a plurality of content types, each content type defining one or more fields, said content types defining structures for content managed via the CMS;

wherein the content project further includes one or more content entries that are generated from said content types of the content model, so that the content entries are structured according to the content types so as to include fields according to the fields of the content types, and the fields of the content entries are used to store the content that is managed via the CMS, whereas the fields of the content types of the content model do not receive or store the content that is managed via the CMS;

responsive to one or more application programming interface (API) calls to the CMA, then assigning one or more annotations to one or more of the content types of the content model, wherein assigning the one or more annotations includes creating a metadata object in a given content type of the content model and adding an annotation to the metadata object;

wherein for the content types of the content model having annotations assigned thereto, the assigned annotations activate an editing functionality of an editing application which accesses the CMA to edit the content managed via the CMS, the editing functionality for editing of the content entries, based on the annotations assigned to the content types of the content model from which the content entries are generated;

wherein the annotations include a root annotation that identifies a given content type as a root of an aggregate for the editing application, and wherein the annotations include a component annotation that identifies a given field of the given content type as a component member of the aggregate;

wherein the content entries are separate from the content types, such that the assignment of the annotations to the content types occurs independent of the content entries generated from said content types, and such that the annotations assigned to the content types are not assigned to the content entries generated from said content types so that metadata objects created for respective annotations of said content types are not associated to the content entries generated from said content types.

12. The system of claim 11, wherein the component annotation enables an automatic display behavior of the given field of the given content type by the editing application.

13. The system of claim 12, wherein the automatic display behavior includes automatic expansion of components of the given field of the given content type in a tree view provided by the editing application that provides a hierarchical view of the content types.

14. The system of claim 12, wherein the automatic display behavior includes automatic expansion of components of the given field of the given content type for editing in an editing view provided by the editing application that enables editing of contents of the given field.

15. The system of claim 11, wherein the one or more API calls to the CMA are in response to input received through a web editor of the CMS, the web editor being separate from the editing application.

* * * * *